G. Bringman,
Meat Tenderer.

No. 110,111. Patented Dec. 13, 1870.

2 Sheets Sheet 1

Witnesses
Jno. A. Ellis
Jas. V. White

Inventor
George Bringman
per
J. H. Alexander
Atty.

G. Bringman,

Meat Tenderer.

No. 110,111. Patented Dec. 13, 1870.

Witnesses
Jno. A. Ellis
Jas. V. White

Inventor
Geo. Bringman
Per
J. H. Alexander
Atty.

United States Patent Office.

GEORGE E. BRINGMAN, OF PHILADELPHIA, PENNSYLVANIA.

Letters Patent No. 110,111, dated December 13, 1870.

IMPROVEMENT IN MEAT AND VEGETABLE-CUTTERS.

The Schedule referred to in these Letters Patent and making part of the same.

*To all whom it may concern:*

Be it known that I, GEORGE E. BRINGMAN, of Philadelphia, in the county of Philadelphia and State of Pennsylvania, have invented certain new and useful Improvements in Deviling Meats, and Meat and Vegetable-Cutter; and I do hereby declare that the following is a full, clear, and exact description thereof, reference being had to the accompanying drawing and to the letters of reference marked thereon which form a part of this specification.

The nature of my invention consists in the construction and arrangement of a machine for deviling and pounding meat, as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and

Figure 2, a plan view of my machine, as a meat-deviler or pounder.

Figure 1:
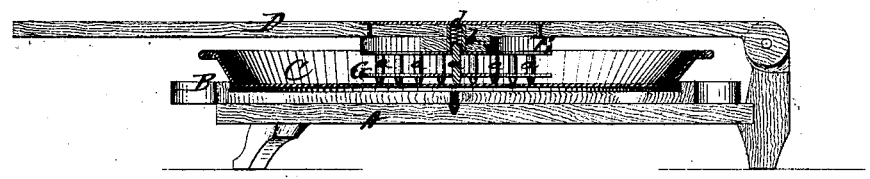
Figure 2:
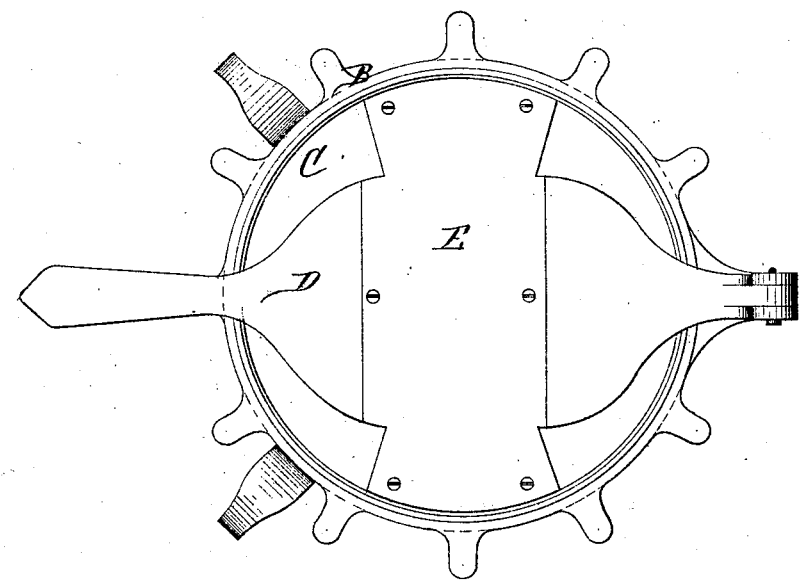
Figure 5:
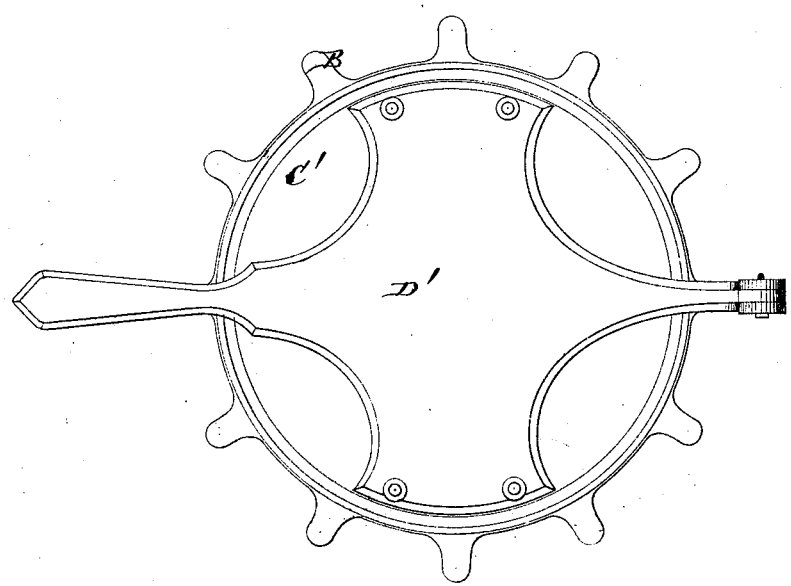
Figure 5 is a plan view of my machine as a meat or vegetable-cutter.
Figure 6:
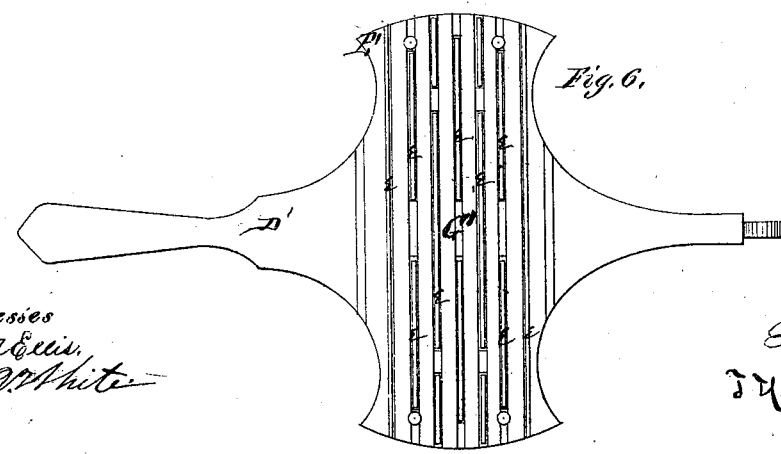
Figure 6 is a bottom view of the cutter.

A represents a stand, of any suitable dimensions, upon which is placed a revolving plate, B, provided with scalloped edges, as shown in figs. 2 and 5, or provided with projections around its circumference a convenient distance apart, so that the plate may readily be revolved around its axis with the hand.

Upon this revolving plate is placed a pan, C, in which the meat is laid for pounding.

A pan is far superior to the usual board or block for pounding the meat, because all the substance of the meat is retained, while on the board or block it is lost.

From one side of the stand A rises a forked standard, of suitable height, in which a lever, D, is pivoted.

Figure 3:
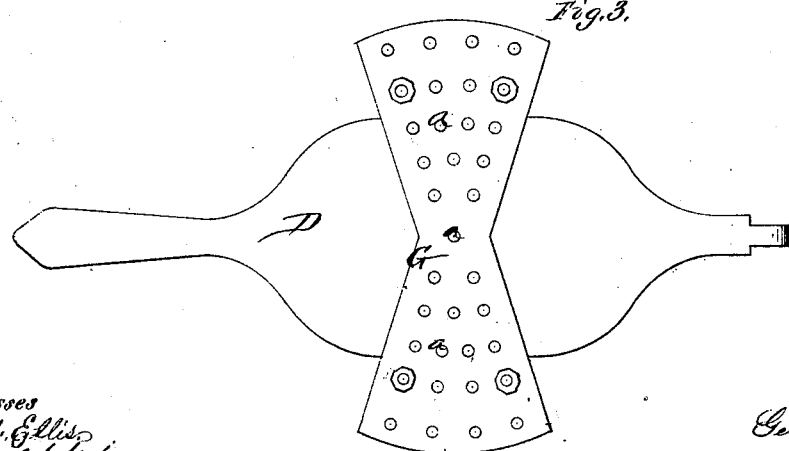
Figure 3 is a bottom view of the deviler
Figure 4:
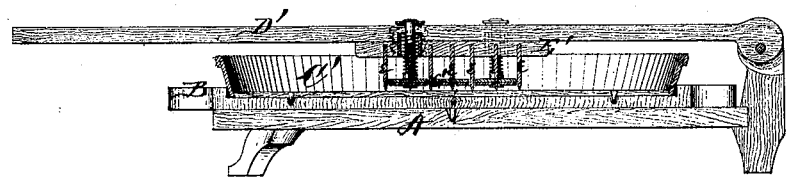
Figure 4 is a longitudinal vertical section.

In the center of this lever, on the under side, is secured a box, E, the peculiar shape of which is shown in fig. 3, its center being narrow and then gradually increasing in width toward the end, said box extending entirely across the bottom of the pan C.

From the bottom of this box projects a number of pins, *a a*, the upper end of each of which extends into a tube, *b*, within the box.

In each of said tubes, above the pin, is placed a spring, *d*, which forces the pin downward for a certain distance.

When the deviler thus constructed is raised the plate B, with the pan and meat, are turned by the other hand.

When the deviler is brought down the pins that strike the bone in the meat give, and the balance remain and penetrate the meat, breaking the grain and rendering it tender.

The spring plate G, near the end of the pins *a a*, and through which the pins pass, is of the same shape as the under side of the box E.

This plate is for the purpose of throwing the meat off of the pins and freeing themselves.

Having thus fully described my invention,

What I claim as new, and desire to secure by Letters Patent, is—

1. The revolving plate B, in connection with a meat-deviling device, as and for the purpose set forth.

2. The box E, provided with pins *a a*, tubes *b b*, and springs *d d*, in combination with the revolving plate B, all arranged substantially as and for the purpose described.

In testimony that I claim the foregoing as my own invention, I affix my signature in presence of two witnesses.

GEO. E. BRINGMAN.

Witnesses:
 A. P. RUTHERFORD,
 HENRY POLSY.